No. 655,410. Patented Aug. 7, 1900.
T. M. MULKERINS.
ALTAR BREAD BOX.
(Application filed Feb. 12, 1900.)
(No Model.) 2 Sheets—Sheet 2.
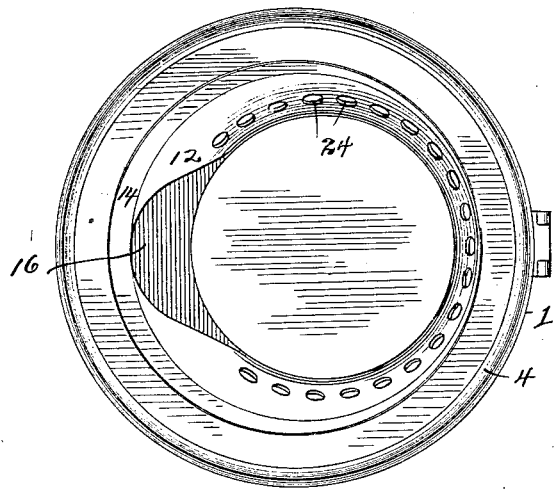
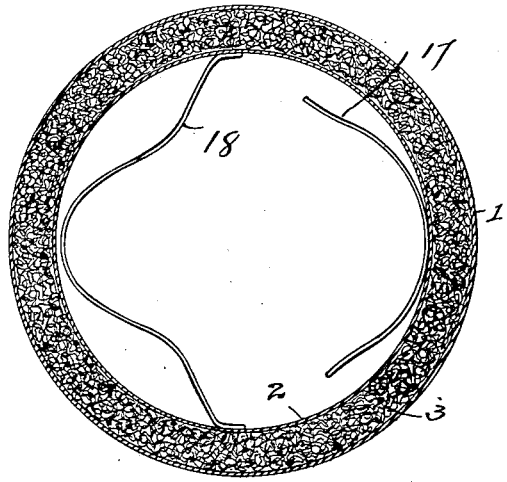

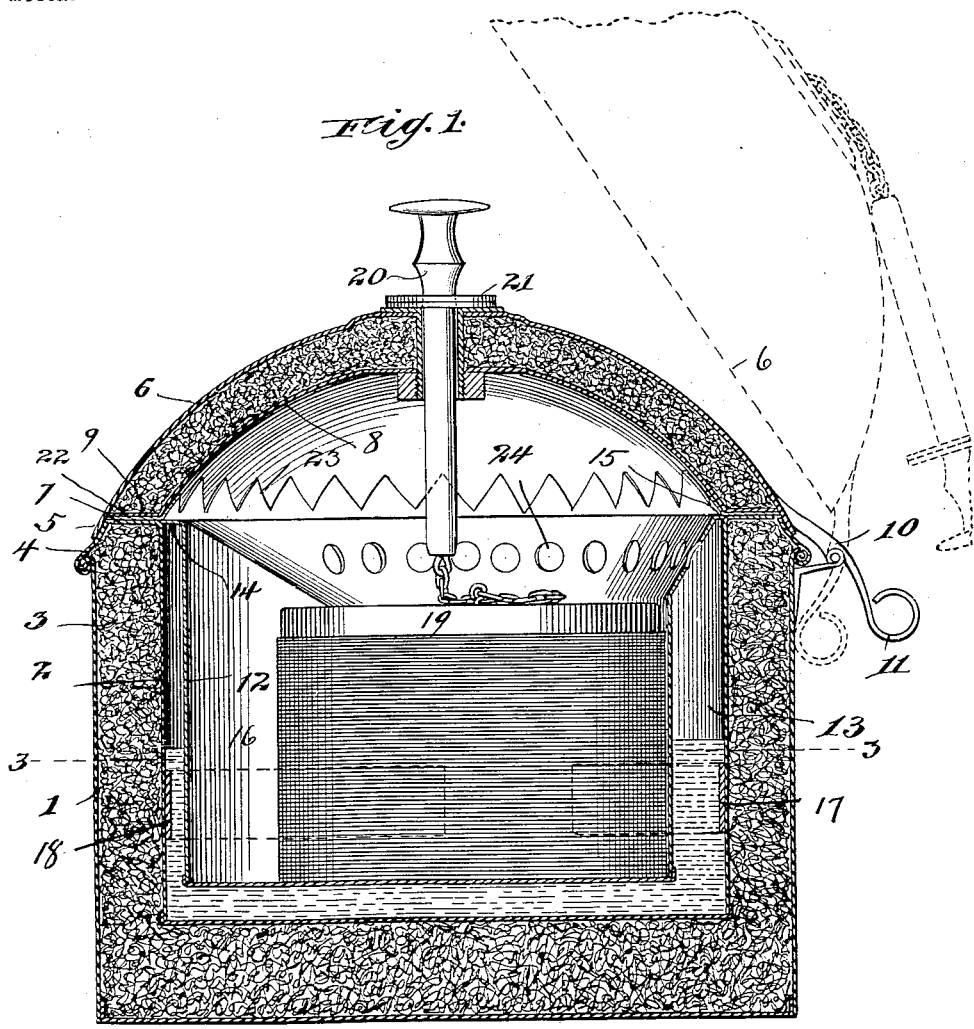

UNITED STATES PATENT OFFICE.

THOMAS M. MULKERINS, OF CHICAGO, ILLINOIS, ASSIGNOR TO JOHN HANLEY, OF ST. JOSEPH, MICHIGAN.

ALTAR-BREAD BOX.

SPECIFICATION forming part of Letters Patent No. 655,410, dated August 7, 1900.

Application filed February 12, 1900. Serial No. 4,953. (No model.)

*To all whom it may concern:*

Be it known that I, THOMAS M. MULKERINS, of Chicago, Illinois, have invented certain new and useful Improvements in Altar-Bread Boxes, of which the following is a specification.

This invention relates to an improved altar bread or wafer box; and it has for its objects to provide a receptacle of the character referred to which will preserve the bread or wafers in proper condition for an indefinite period of time and so constructed and arranged that it not only affords convenient access to the contents, but will automatically close itself; to provide a construction in which the contents are at all times held compressed beneath a weight which will prevent the bread or wafers from becoming distorted, and, in general, to provide a simple, efficient, and convenient device of the character referred to.

To the above ends the invention consists in matters hereinafter described and more particularly pointed out in the appended claims and will be readily understood from the following description, reference being had to the accompanying drawings, in which—

Figure 1 is an axial view of a receptacle embodying my invention, the bread or wafers and the weight resting thereon being shown in elevation. Fig. 2 is a top plan view of the receptacle with the cover removed, and Fig. 3 is a horizontal sectional view taken on line 3 3 of Fig. 1 and looking downwardly.

Referring to the drawings, 1 designates as a whole a cylindric vessel or outer casing made somewhat larger than the required dimensions of the interior, so as to provide room for an inner casing 2 and an intervening insulating-space between the outer and inner walls 3. At its upper edge said outer receptacle is provided with an upwardly and inwardly beveled rim portion 4, adapted to receive the flange 5 of a cover, designated as a whole 6, which in the preferred construction shown herein is of convex or partispherical shape in its general conformation, the flange 5 being formed by a continuation of the outer shell of the cover beyond the meeting edges of the receptacle and cover.

The inner casing 2 is desirably and as shown herein of the same general shape as the outer receptacle, but is of somewhat-smaller diameter and of less depth than said outer receptacle, so as to provide the intervening space 3, which is filled with a suitable insulating-packing of felt or the like. At its upper edge said inner casing is provided with a radially-outturned flange 7, which extends at its outer margins to and is connected with the inner wall of the outer shell, so as to close the upper end of the annular insulating-space 3 and form a seat upon which the cover rests. The cover 6 is likewise provided with an inner lining or casing 8, conformed approximately to the external shape of the cover and likewise provided with a radially-outturned flange 9, united at its outer margin with the outer casing of the cover and forming a supporting-surface which rests upon the top edge of the main body when the cover is in position, the insulating-space formed between the outer and inner casings of the cover being also filled with insulating material, as indicated clearly in the drawings.

The cover 6 is desirably and as shown herein united with the main body of the receptacle by means of a hinged connection 10, the hinge member 11, which is rigidly connected with the cover, being extended beyond the pivotal axis of the hinge to form a projection which limits the extent to which the cover may be opened by contacting with the side wall of the receptacle, as indicated in dotted lines in Fig. 1, this limit of opening being so arranged that the cover will fall shut by gravity as soon as released and thereby preventing the receptacle from being accidentally left open for a longer period than is necessary to insert or remove the contents.

Within the main body of the receptacle is removably seated an inner receptacle 12 of somewhat smaller diameter than the internal diameter of the outer receptacle, so as to provide a surrounding annular space 13. Said inner receptacle is conveniently and as herein shown suitably supported within the outer receptacle by means of a radially-outturned flange 14, extending around the upper margin thereof and engaging at its outer edges a slight ledge or shoulder 15, formed in the inner casing adjacent to its upper edge.

The main body of the inner receptacle is conformed approximately in cross-sectional form to the shape of the altar bread-wafers it is designed to contain, in the present instance circular, but is provided at one side with a lateral extension or enlargement 16, which permits a thumb or finger of the user to be inserted downwardly alongside of the wafers in order to take hold of the latter.

Inasmuch as it is desirable that the inner receptacle be always held in such angular relation to the position of the cover as to afford the most convenient access to the contents, holding devices or clips 17 18 are secured upon the interior of the inner casing in position to embrace the inner receptacle and to hold it from rotation, as indicated most clearly in Fig. 3.

19 designates a flat weight adapted to rest upon the bread-wafers to prevent the latter warping, said weight being desirably conformed approximately to the shape and size of the wafers, as indicated clearly in the drawings. In order to lift said weight and by the same movement lift the cover of the receptacle, a spindle 20 is arranged to extend loosely through a suitable aperture in the cover, the lower end of said spindle being connected with the weight by means of any suitable flexible connection which will permit the weight to rest upon the contents whether the box contain few or many of the wafers, a chain connection being shown in the present instance. In order to form a close joint around the spindle, the latter is provided with an encircling radial sealing-flange 21, which normally rests in contact with the cover, and the under side of this flange is desirably provided with a sheet or covering of felt or other suitable air-excluding material. Desirably also one surface or the other of the meeting edges of the cover and receptacle will be provided with a similar cover of felt or other suitable material, the cover member being shown in the present instance as provided with such a covering 22, the inner edges of which are extended some distance upward and secured against the interior of the inner casing of the cover, as indicated at 23.

The operation of the device will be perfectly obvious from the foregoing description and need not therefore be repeated in detail. It may, however, be noted that as the user lifts the weight by means of the spindle the weight will be carried up into contact with the bottom of the cover and the cover thereafter lifted by a continuation of the same movement, and in this connection it may be noted that the upper end of the wafer-receptacle is made flaring, as indicated clearly in the drawings, to insure the return of the weight exactly to position by simply allowing the cover to close by its own weight. Should it be desired to keep the wafers in proper condition for any considerable period of time, a suitable quantity of liquid may be introduced between the inner and outer receptacles, so that the vapor from the liquid may maintain the internal atmosphere sufficiently humid to keep the wafers in perfect condition, and in order that a proper circulation of air may obtain within the receptacle to insure all portions becoming properly humidified the flaring portion of the inner receptacle is provided with openings, (indicated at 24.)

While I have herein shown and described what I deem to be a preferred embodiment of my invention, yet it will be obvious that the details thereof may be modified to some extent without departing from the invention, and I do not therefore wish to be limited to these exact details, except as they may be made the subject of specific claims.

I claim as my invention—

1. In an altar-bread box, the combination of a receptacle comprising outer and inner casings and an intervening insulating-space, the upper portion of said receptacle being removable to afford access thereto, an interior chamber conformed approximately in cross-sectional form to the shape of the bread-wafers, and provided at one side with an extension to afford access to the edges of the wafers, and a weight adapted to rest upon the bread when the receptacle is closed.

2. In an altar-bread box, the combination of a receptacle comprising outer and inner casings and an intervening insulating-space, the upper portion of said receptacle being removable to afford access thereto, an interior chamber conformed approximately in cross-sectional form to the shape of the bread-wafers, and provided at one side with an extension to afford access to the edges of the wafers, a weight adapted to rest upon the bread when the receptacle is closed and a spindle mounted to extend loosely through the cover portion of the receptacle and flexibly united at its lower end with said weight, whereby the weight may be lifted from the contents and the cover of the receptacle removed by the same operation.

3. In an altar-bread box, the combination of a receptacle comprising outer and inner casings and an intervening insulating-space, the upper portion of said receptacle being removable to afford access thereto, an inner receptacle removably seated within the outer receptacle, having its interior conformed in cross-sectional form approximately to the shape of the bread-wafers for which the device is designed, and provided at one side with an extension-space to afford access to the edges of the bread-wafers, holding devices for holding said removable receptacle from rotation within the outer receptacle, a weight adapted to rest upon the bread when the receptacle is closed and a spindle mounted to extend loosely through the cover portion of the receptacle and flexibly united at its lower end with said weight, whereby the weight may be lifted from the contents and the cover of the receptacle removed by the same operation.

4. In an altar-bread box, the combination of a receptacle comprising outer and inner casings and an intervening insulating-space filled with insulating material, the upper portion of said receptacle being made removable to afford access to the interior thereof, a sheet of air-excluding material interposed between the meeting parts of the joint between the cover and main body of the receptacle, an inner receptacle of smaller dimensions than the interior of the outer receptacle, removably seated within the latter in such manner as to provide an intervening liquid-space between the outer walls of the removable receptacle and the interior of the outer receptacle, a weight adapted to rest upon the bread when the receptacle is closed and a spindle mounted to extend loosely through the cover portion of the receptacle and flexibly united at its lower end with said weight, whereby the weight may be lifted from the contents and the cover of the receptacle removed by the same operation.

5. In an altar-bread box, the combination of a receptacle comprising outer and inner casings and an intervening insulating-space provided with a filling of insulating material, the main body of said receptacle being made cylindric and its upper portion being made convex and constructed to form a cover hinged to the main body at one side thereof, the hinge connections being such as to permit a limited opening only of the cover whereby the latter will automatically close by gravity when the device is in upright position, a body of air-excluding material interposed between the meeting parts of the cover and main body, an inner receptacle of smaller diameter than the internal diameter of the outer receptacle provided at its upper end with an outturned flange whereby it is suspended within the outer receptacle and free from contact with the walls thereof, the interior of said inner receptacle being conformed in cross-sectional form approximately to the shape of the altar bread-wafers throughout its main body, but provided at one side with a lateral extension to afford access to the edges of the wafers, means for holding said inner receptacle in fixed position in relation to the outer receptacle, a weight conformed approximately to the shape of the bread-wafers and adapted to rest upon the latter to hold them flat, a spindle arranged to extend loosely through the cover and flexibly united at its lower end with said weight, a sealing flange or shoulder upon said spindle arranged to normally rest in contact with the outer surface of the cover and a sheet of air-excluding material interposed between said sealing flange or shoulder and the supporting-surface of the cover around the aperture therein, substantially as described.

THOMAS M. MULKERINS.

Witnesses:
ALBERT H. GRAVES,
FREDERICK F. GOODWIN.